United States Patent
Drury

[11] 3,945,161
[45] Mar. 23, 1976

[54] GLAZING STRIP
[75] Inventor: Cyril John Drury, Abingdon, England
[73] Assignee: British Leyland UK Limited, London, England
[22] Filed: July 11, 1974
[21] Appl. No.: 487,638

[30] Foreign Application Priority Data
July 12, 1973 United Kingdom............... 33323/73

[52] U.S. Cl. ...................... 52/208; 52/400; 52/403
[51] Int. Cl.² ...................... E06B 3/62; E04F 15/14
[58] Field of Search ...................... 52/208, 397–400, 52/403

[56] References Cited
UNITED STATES PATENTS

| | | | |
|---|---|---|---|
| 2,736,404 | 2/1956 | Clingman | 52/208 |
| 3,343,317 | 9/1967 | Cripe | 52/208 |
| 3,672,109 | 6/1972 | Erck | 52/397 |
| 3,728,832 | 4/1973 | Erck | 52/403 |

FOREIGN PATENTS OR APPLICATIONS

| | | | |
|---|---|---|---|
| 630,743 | 11/1961 | Canada | 52/397 |
| 148,698 | 2/1955 | Sweden | 52/398 |

Primary Examiner—Ernest R. Purser
Assistant Examiner—James L. Ridgill, Jr.
Attorney, Agent, or Firm—Brisebois & Kruger

[57] ABSTRACT

An elastomeric glazing strip for dry-mounting a window pane in a frame, the bottom of the channel in the strip for receiving the glass being formed by a web which resiliently flexes into an interior space of the strip for accommodating manufacturing tolerances in the dimensions of the glass and frame.

6 Claims, 1 Drawing Figure

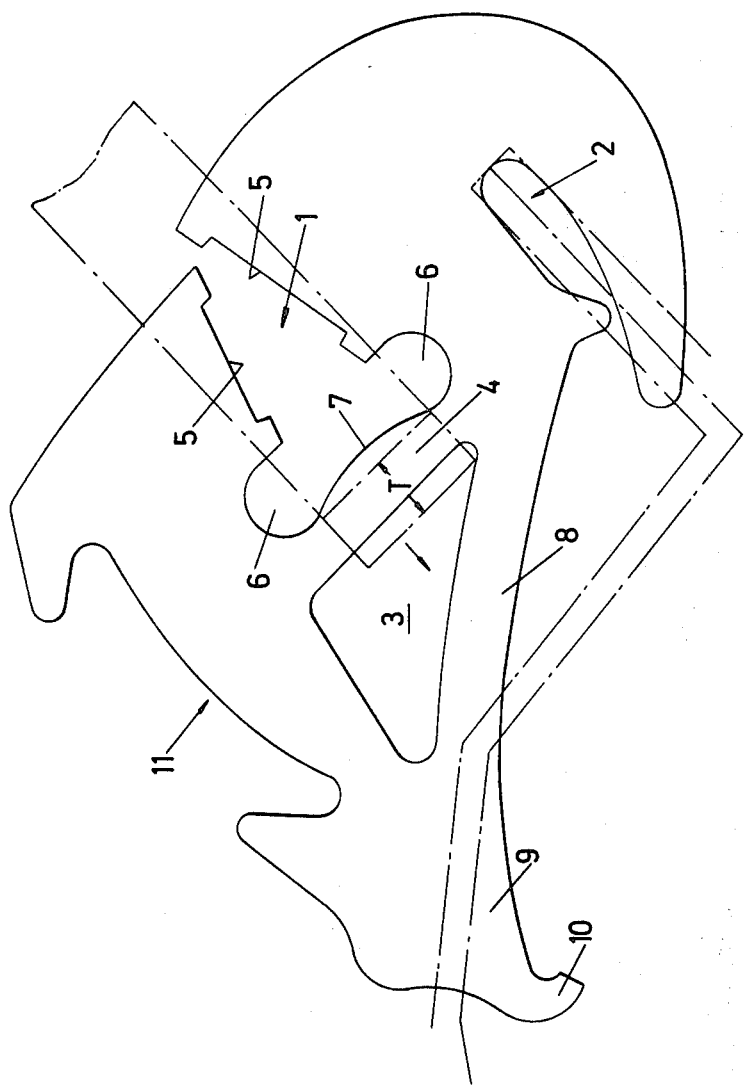

GLAZING STRIP

This invention relates to a glazing strip suitable for use in the mounting of windscreens in motor vehicles.

A windscreen is usually mounted in a rebate in a metal frame, the back of the rebate being defined by an inner peripheral flange of the frame. A glazing strip of rubber or other elastomeric material supports the screen in the rebate, the strip being formed with two oppositely facing channels which respectively accommodate the edge of the screen and the above-mentioned flange. It is with improvements in this kind of glazing strip that the present invention is concerned.

The conventional glazing strip is formed with longitudinal sealing flaps which are compressible between the edge of the screen and the frame so as to accommodate manufacturing tolerances in the size of the screen and the size of the frame opening. It has been found that if the screen is undersize in relation to the frame opening, the flips exert inadequate resilient pressure at the top of the screen/frame for proper sealing and instead tend to eject the screen from the rebate in the frame. If the screen is oversize in relation to the frame opening, the sealing pressure is exaggerated such that the strip tends to lozenge, that is to say deform in cross-section. In each case the result is an unattractive variation in the appearance of the strip around the perimeter of the screen, poor retention of the latter in the frame, and unreliable sealing.

A glazing strip according to the invention has a tubular cross-section such that the bottom of the channel for receiving the glass is formed by a web of the elastomeric material. As the glass is fitted complete with the glazing strip into the frame, the web flexes resiliently into the space afforded by the tubular cross-section of the strip, thus accommodating the previously mentioned manufacturing tolerances and establishing a firm sealing pressure on and around the frame without lozenging.

The size of the manufacturing tolerances which can be satisfactorily accommodated depends on the distance through which the web can flex. To increase this distance the width of the web is preferably such that it undercuts the opposed side-walls of the channel for receiving the glass.

To provide improved sealing between the edge of the glass and the strip, the web preferably defines a convex bottom of the channel for receiving the glass. Conveniently, the web is bowed in width towards the opening of the channel. Preferably, however, the convex bottom of the channel is provided by a thickening of the web towards its mid-line.

In a preferred glazing strip, the tubular cross-section has a substantially triangular internal configuration, one wall thereof comprising the said web and another wall thereof comprising a second web which extends, in width, between one side of the channel for receiving the flange and a toe portion that is adapted to make dry-sealing contact with the frame. In a rebated frame, of which the flange forms the back of the rebate, the second web extends diagonally across the rebate and acts in tension to brace the strip in cross-section.

The toe portion preferably has a surface substantially co-extensive with the second web in the cross-section of the strip, which surface is formed with one or more ribs longitudinally of the strip for making sealing contact with the frame. The or each rib is preferably of rectangular cross-section and makes continuous line-contact with the frame surface.

A preferred glazing strip according to the invention will now be described, by way of example only, with reference to the accompanying drawing which shows the strip in cross-section.

Referring to the drawing, the strip consists of an extrusion of synthetic rubber formed, principally, with two oppositely facing channels 1 and 2 for receiving, respectively, the edge of the glass (shown in broken line) and the inner peripheral flange of a rebated frame (also shown in broken line) and a tubular cross-section at 3, having a substantially triangular internal configuration.

One side of the triangular section 3 comprises a first web 4, which forms the bottom of the channel 1. The web 4 has a width that undercuts the opposed side-walls 5 of the channel 1, in the places indicated by the reference numeral 6, and has an enlarged thickness towards its mid-line which defines a convex surface 7 of the bottom of the channel 1.

A further side of the triangular section 3 is formed by a second web 8 which extends between one side of the channel 2 and a toe portion 9 of the strip. The toe portion 9 is formed with a substantially rectangular-section proboscis 10 for making dry-sealing contact with the frame.

The third-side of the traingular section 3 is formed at the front side of the strip with a re-entrant channel 11 for receiving and retaining a decorative flashing or finishing strip e.g. a strip of bright-work.

When the glass is fitted complete with the glazing strip into the frame, the web 4 flexes in the direction of the arrow into the triangular section 3, with the result that the strip is held resiliently against the frame. The amount of manufacturing tolerance in the size of the glass and frame that can be accommodated by the strip is indicated by the distance T.

What is claimed is:

1. In a glazing strip of elastomeric material formed with two oppositely facing channels having solid walls and adapted to receive, respectively, the edge of a glass panel and the inner peripheral edge of a rebated frame for said panel, the improvement according to which said glazing strip comprises a tubular portion surrounding an elongated duct, said duct being triangular in section and running parallel to said channels, and said tubular portion comprising:

a. a first web having a first surface defining the bottom of the channel for receiving the glass and an opposite surface defining one side of said triangular duct, with both surfaces of said web extending substantially the fall width of said glass-receiving channel;

b. a wall portion defining the second side of said duct and which extends from the side of the channel for receiving the glass remote from said frame-receiving channel to a toe portion of said strip adapted to make dry-sealing contact with the frame; and c. a second web extending from the end of said first web nearest the channel for receiving said frame to the end of said wall portion adjacent said toe portion, said second web having a length greater than its thickness, an inner surface defining the third side of said duct and an outer frame-contacting surface remote from said duct, the distance of said outer surface from said inner web increasing as said outer surface approaches said toe portion.

2. A glazing strip according to claim 1, in which the second web is bowed across its width towards the first web.

3. A window assembly comprising a window pane mounted in a frame by means of a glazing strip according to claim 1.

4. A glazing strip as claimed in claim 1 in which said wall portion is provided with an external channel for receiving a finishing strip.

5. A glazing strip according to claim 1, in which the first web has a width such that it undercuts the opposed side walls of the channel for receiving the glass.

6. A glazing strip according to claim 5, in which the first web defines a convex bottom of the channel for receiving the glass.

* * * * *